June 17, 1952   C. E. ELLIS   2,600,523
POLYPHASE ALTERNATING CURRENT DYNAMOELECTRIC APPARATUS
Filed May 24, 1949   3 Sheets-Sheet 1
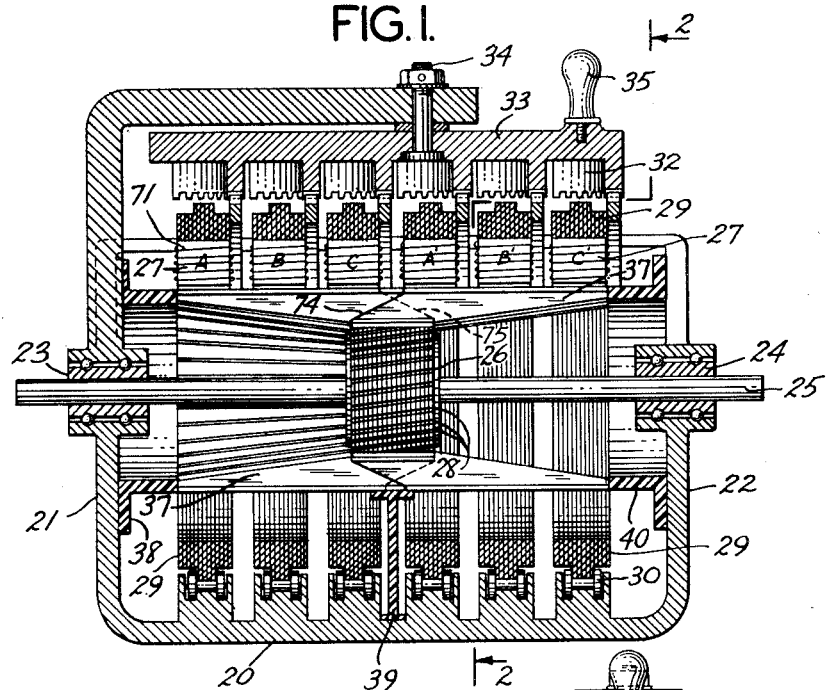
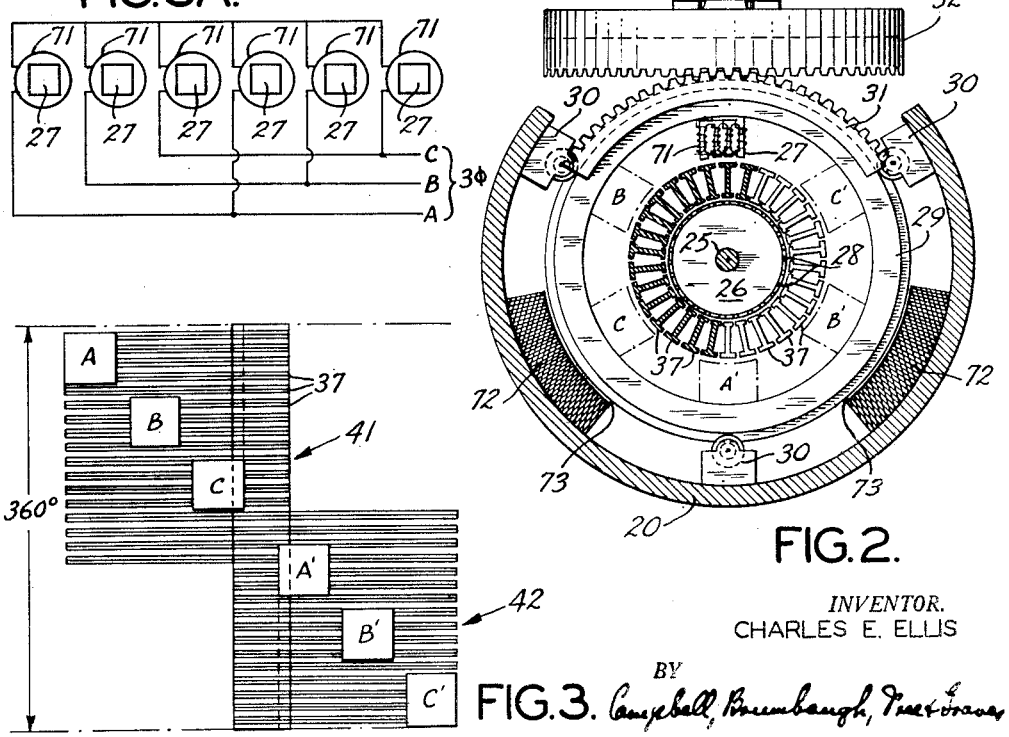
INVENTOR.
CHARLES E. ELLIS
BY
his ATTORNEYS.

INVENTOR.
CHARLES E. ELLIS
BY
*Campbell, Brumbaugh, Free & Graves*
his ATTORNEYS.

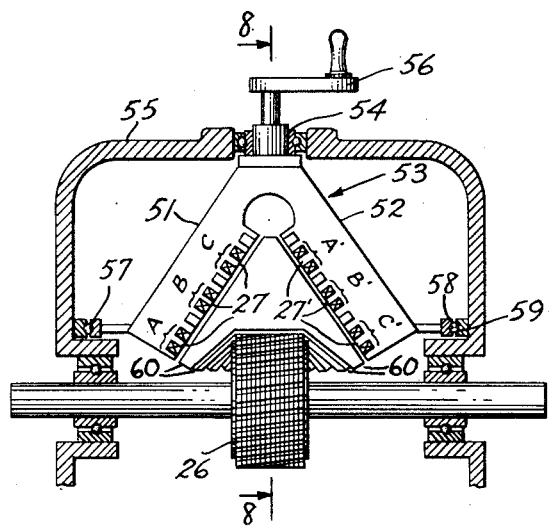
FIG. 7.
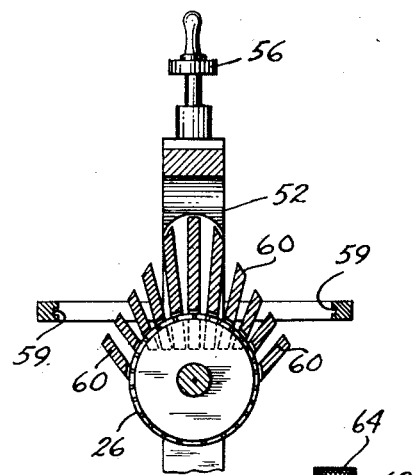
FIG. 8.
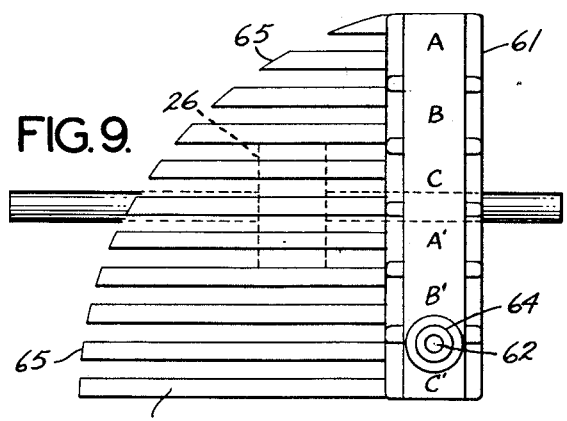
FIG. 9.
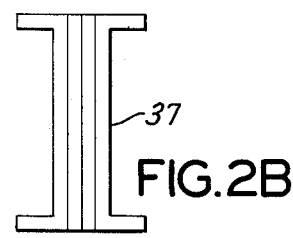
FIG. 10.
FIG. 2B
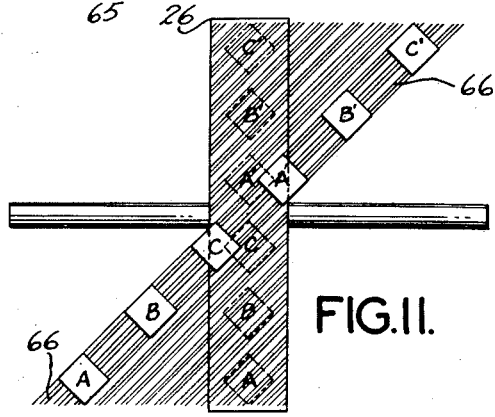
FIG. 11.
INVENTOR.
CHARLES E. ELLIS
BY
his ATTORNEYS.

Patented June 17, 1952

2,600,523

UNITED STATES PATENT OFFICE 2,600,523

POLYPHASE ALTERNATING CURRENT DYNAMOELECTRIC APPARATUS

Charles E. Ellis, Mahwah, N. J.

Application May 24, 1949, Serial No. 95,037

16 Claims. (Cl. 318—243)

The present invention relates to dynamoelectric machines and more particularly to new and improved polyphase alternating current dynamo apparatus operable alternatively as a generator or as a highly effective adjustable speed motor.

In my copending application Serial No. 633,151, filed December 6, 1945, now Patent 2,470,767, for "Polyphase Alternating Current Dynamo," is disclosed a novel polyphase alternating current dynamo in which a flux concentration is moved in a line along a series of linearly disposed pole faces which are skewable with respect to a movable, elongated nonmagnetic conductor. As a motor, the conductor is moved to successively parallel positions at an angle to its length and the speed of the conductor is a function of the angle of skew of the pole faces. Operated as an induction generator, the rate of movement of the flux varies with the angle of skew between the stator pole faces and the conductors and is independent of conductor speed.

In rotating dynamoelectric machines of the above character comprising a rotor and a stator, the moving flux concentration produced by the skewed pole faces causes both rotary and axial flux components to enter the rotor, necessitating the provision of special means in the rotor to carry axial flux. Further, each conductor is moved parallel to and a substantially fixed distance from the pole faces, so that the length of each conductor is substantially the same as the length of the row of pole faces.

The purpose of the present invention is to provide polyphase alternating current dynamoelectric apparatus of the above character in which the rotor carries conductors of standard size and does not carry any substantial amount of axial flux. This is accomplished, according to the invention, by interposing between the conductors and the row of skewed pole faces, magnetic flux conductor means providing an axial path for any axial flux component of the flux concentration moving along the row of pole faces, a corresponding axial flux path also being provided in the stator. The flux conductor means is also preferably shaped so that any flux component at an angle to the rotor conductors is directed inwardly towards the rotor, which may be considerably shorter than the row of pole faces. Also, the cross-sectional area of the flux conductors preferably varies as a function of the flux density they are required to carry, which is a minimum in the vicinity of the outermost pole pieces when in the maximum skew position, and a maximum at a zone in the vicinity of the zero skew position of the poles.

In order to minimize rotary leakage, the axial flux path is preferably formed by tooth-shaped magnetic flux conductors having maximum face area opposite pole and rotor and minimum permeance in the direction of movement of the conductors.

In one embodiment in which all the pole faces lie on a straight line that can be skewed about its midpoint with respect to the conductors, the axial flux path comprises a plurality of magnetic conductors so disposed as to carry flux from any pole face in any position of skew to the rotor, which is preferably mounted substantially midway between the two extreme pole faces.

According to a second embodiment, the pole faces are mounted in two groups which are skewable in opposite directions about the opposite ends of the row from an aligned position to various positions of skew. Since the outermost pole faces do not move very far when the two groups are skewed, the maximum displacements being given the two innermost pole pieces, this form is more economical in the use of material for the axial flux paths.

In a further modification, the cross-sectional area of the axial flux paths is made a maximum directly beneath the row of pole faces when in the unskewed position, and it decreases progressively on opposite sides of the unskewed pole face position to a minimum at the positions occupied by the furthest displaced pole faces at maximum skew. By virtue of this construction, the leakage reactance is effectively minimized.

Axial flux paths may also be used advantageously in polyphase alternating current dynamoelectric machines in which the array of pole faces is mounted for rotation with respect to the conductors and such further modifications are within the scope of the invention.

It will be apparent, therefore, that the invention enables the advantages of the dynamoelectric apparatus disclosed in the aforementioned copending application to be fully realized with a substantially smaller rotor having a lesser moment of inertia and reduced leakage reactance.

Additional objects and advantages will be apparent from the following detailed description of several typical forms of the invention, taken in conjunction with the accompanying drawings, in which:

Fig. 1 is a view in vertical section of alternating current dynamoelectric apparatus constructed according to the invention;

Fig. 2 is a view in section, taken along line 2—2 of Fig. 1, looking in the direction of the arrows;

Figs. 2A and 2B are detail views in transverse section of the magnetic pole piece and the magnetic flux conductor construction, respectively, in the apparatus shown in Fig. 1;

Fig. 3 is a developed view of typical axial flux conductors for the apparatus shown in Fig. 1;

Fig. 3A illustrates schematically a typical manner of connecting the pole face windings to an alternating current source;

Fig. 7 is a view in vertical section of a further modification;

Fig. 8 is a view in section taken along line 8—8 of Fig. 7, looking in the direction of the arrows;

Fig. 9 is a plan view of still another form of dynamoelectric apparatus according to the invention;

Fig. 10 is an end view of the apparatus shown in Fig. 9; and

Fig. 11 illustrates schematically another embodiment in which the pole faces are mounted so as to be moved parallel to the rotor axis.

Figure 4:
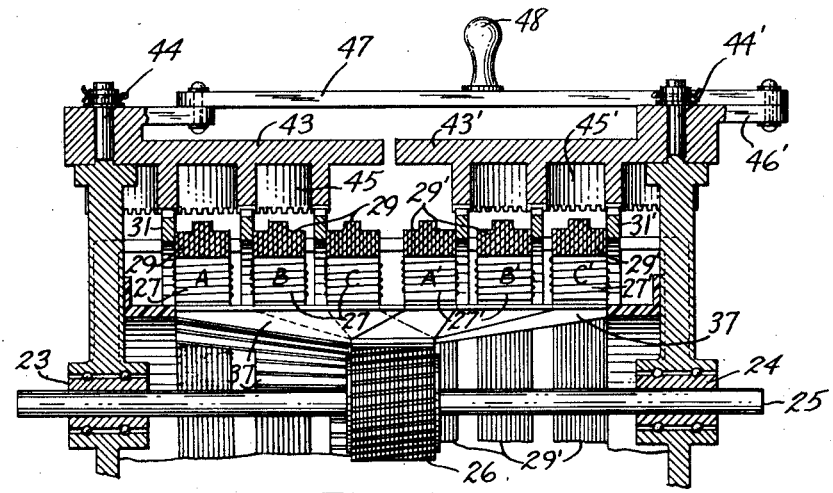
Fig. 4 is a partial view in vertical section illustrating another modification.

Referring now to Fig. 1, polyphase alternating current dynamo electric apparatus is shown comprising a housing 20 having end plates 21 and 22 provided with bearings 23 and 24, respectively, in which is journalled a rotor shaft 25. Secured on the shaft 25 is a rotor 26 which may be a conventional, laminated squirrel cage rotor including a plurality of parallel short-circuited conductors 28. Preferably, the conductors are slightly skewed relatively to the rotor axis as in the conventional induction motor practice. If desired, the usual wound rotor may be employed.

Within the housing 20 are mounted a longitudinally extending row of pole pieces 27, six being shown in Fig. 1 by way of example, preferably made of stacked laminations so as to minimize losses, in accordance with good engineering practice. The pole pieces 27 are mounted in a row for relative rotation with respect to each other so that the row can be skewed to any desired angle with respect to the rotor conductors 28. To this end, each pole piece 27 (Figs. 1 and 2) may be secured on a ring 29, laminated in the radial direction for minimum losses and mounted in suitable bearings 30 formed in the housing 20. Each ring 29 carries a toothed sector 31 which is engaged by a corresponding toothed sector 32 mounted on an arm 33. The arm 33 is pivotally mounted on the housing 20 at 34 and it is provided with a suitable handle 35 at one end thereof.

It will be understood that when the arm 33 is turned about the pivot 34 by means of the handle 35, the pole pieces 27 will be rotated different amounts about the rotor axis so that the row formed thereby will be skewed with respect to the conductors 28 as shown in Fig. 3.

Figure 2A:
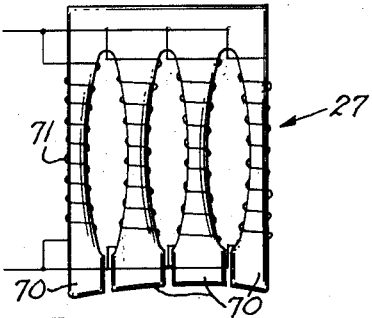

Preferably, each pole piece 27 comprises a plurality of legs 70, four being shown in Fig. 2A, each of which carries a winding 71, all of the windings 71 being connected in parallel, as indicated. This construction tends to reduce weakening of the current by magnetic leakages associated with overlapping legs 71 on the pole pieces 27 in positions of skew where the poles 27 overlap, thereby tending to increase the torque.

The several parallel connected groups of windings 71 on the pole piece 27 are adapted to be energized from a suitable three phase source of alternating current as shown in Fig. 3A so as to produce a magnetic flux concentration which moves along the row of pole pieces 27. For convenience, only one winding 71 is shown for each pole piece 27 in Fig. 3A, it being understood that, in practice, each pole piece 27 carries a plurality of parallel connected windings 71, as shown in Fig. 2A. When the row of pole pieces 27 is parallel to the rotor conductors 28, there are no magnetic flux linkages with the conductors 28 so that the rotor remains at rest. However, when the row of pole pieces 27 is skewed with respect to the conductors 28, there is a component of magnetic flux linking the conductors 28 so that the rotor 26 rotates, its speed depending upon the angle of skew.

In order to permit a rotor 26 of standard size to be used, a plurality of axially extending magnetic flux conductors 37 are interposed in the space between the pole pieces 27 and the rotor 26 (Figs. 1, 2 and 3). The flux conductors are preferably secured within the housing 20 by any suitable non-magnetic, non-conducting means such as the plastic rings 38, 39 and 40, for example. These flux conductors are preferably formed so as to have maximum surface area on the sides facing the poles 27 and the rotor 26, and minimum permeance in a direction perpendicular to their lengths. Preferably, they should be tooth-shaped, as shown in Figs. 2B and 3, and laminated in planes parallel to their lengths so as to minimize losses.

Return paths for the axial magnetic flux may be provided by a plurality of longitudinally extending members 72 on the housing 20. The members 72 are laminated to minimize losses and separated by narrow air gaps 73 from the rings 29 so as to minimize friction on the rings 29 and to prevent the formation of eddy current paths such as might result if the mutually perpendicular laminations on the rings 29 and on the members 72 were in contact.

The purpose of the flux conductors 37 is to provide an axial path of low reluctance for the axial flux component for any position of the pole pieces 27 from the position of zero skew to the position of maximum skew. If, in the maximum skew position, the pole faces are equally spaced apart around the rotor axis, as shown in Fig. 2, the magnetic flux conductors 37 may be disposed in two, overlapping staggered arrays which, in the developed view shown in Fig. 3, occupy two, staggered, overlapping, substantially rectangular areas 41 and 42. For minimum leakage, the flux conductors should preferably be of minimum depth at the ends nearest the end plates 21 and 22, and the depth should increase progressively to a maximum over the rotor 26 as shown, in order to avoid possible saturation of the flux conductor metal. Also the corners should preferably be cut at 74 and 75 in Fig. 1, for example.

In operation of the dynamoelectric machine illustrated in Figs. 1-3, inclusive, three phase alternating current is impressed on the parallel connected pole piece windings 71 as shown in Figs. 2A and 3A. If the row of pole pieces 27 is parallel to the rotor conductors 28, none of the flux links the conductors 28 and the rotor 26 remains at rest. By turning the arm 33 about its pivot 34, the row of pole pieces 27 may be skewed with respect to the rotor conductors 28 as shown in Fig. 3. In this position there is a flux component linking the conductors 28 so that the motor rotates at a speed which is a function of the angle of skew. With this construction, the speed of the rotor 26 may be adjusted over a relatively wide range by moving the handle 35 to adjust the skew angle of the pole pieces 27, thus providing a highly effective adjustable speed alternating current motor.

Figure 5:
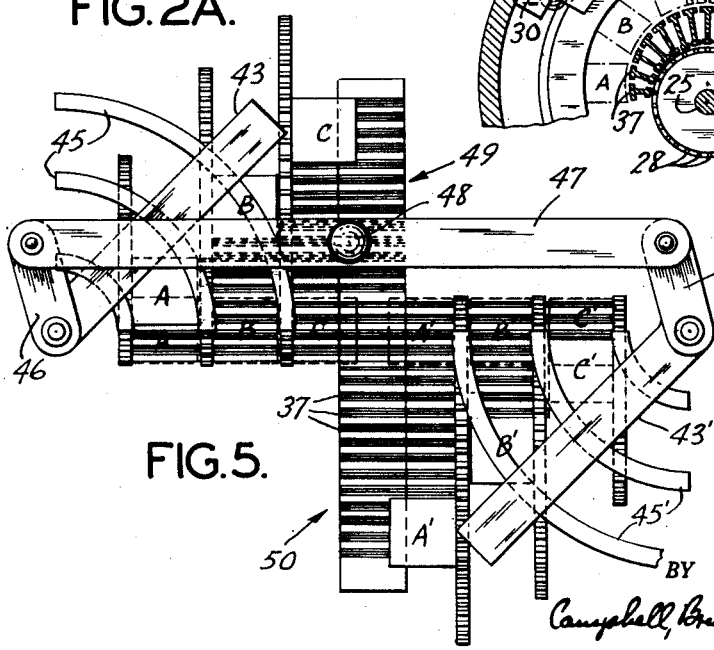
Fig. 5 is a partial plan view of the apparatus shown in Fig. 4, illustrating the mechanism for moving the pole faces, superimposed on a developed view of the axial flux conductors.

In the form of the invention shown in Figs. 4 and 5, two groups of pole pieces 27 and 27' are provided which are adapted to be rotated in opposite directions about the rotor axis to form two parallel, skewed rows. Thus, the pole pieces 27 may be rotated by an arm 43 pivoted at 44 and carrying suitable toothed sectors 45 adapted to engage the toothed sectors 31 on the rings 29 for this purpose. Similarly, the pole pieces 27' may be rotated by an arm 43' pivoted at 44' and carrying toothed sectors 45' adapted to engage the toothed sectors 31' on the rings 29'.

Any suitable mechanical linkage may be employed for simultaneously turning the arms 43 and 43' to skew the two rows of pole pieces 27 and 27'. For example, the arms 43 and 43' may be provided with bell-cranks 46 and 46' (Fig. 5) suitably connected by a mechanical linkage 47 having a handle 48. By proper manipulation of the handle 48, it will be understood that the two rows of pole pieces 27 and 27' may be moved into alignment, as shown in dotted lines in Fig. 5, or to different parallel skewed positions as shown in full lines in this figure, for example.

Since the pole pieces 27 and 27' receiving the maximum displacement are located intermediate the rotor axis, the magnetic flux conductors can be disposed in staggered arrays 49 and 50 of the type illustrated in the developed view shown in Fig. 5. These arrays are substantially triangular in shape, the hypotenuse of each triangle being stepped to accommodate the corresponding pole faces in their positions of maximum displacement. It will be apparent, therefore, that less material is required to form the magnetic flux guides 37 than is needed for the embodiment shown in Figs. 1-3, inclusive, and the material is used to better advantage.

Figure 6:
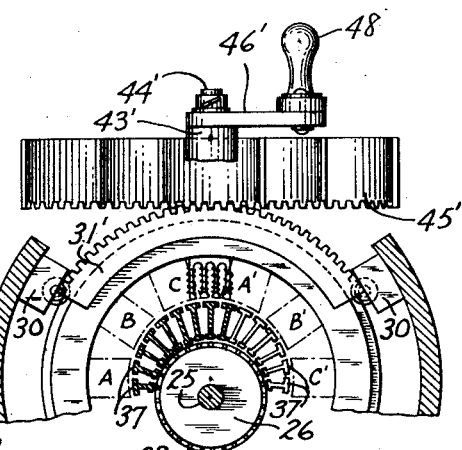
Fig. 6 is a view partly in transverse section, of another embodiment of the invention.
Figure 6A:
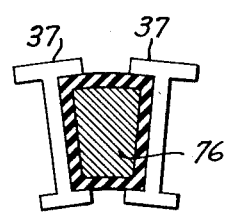
Fig. 6A is a detail of a modified form of the embodiment shown in Fig. 6.

Fig. 6 illustrates a further modification in which the depth of the respective magnetic flux conductors 37 is a maximum directly below the zero speed position of the row of pole faces and decreases progressively to a minimum at the positions assumed by the endmost pole faces when the row is given the maximum skew angle possible. In this manner, leakage in a direction around the rotor axis is minimized and possible magnetic saturation of the flux conductors 37 may be avoided. If desired, conducting bars 76 of copper, for example, may be inserted between adjacent magnetic flux conductors 37, insulated both from the flux conductors 37 and the motor frame as shown in Fig. 6A. The bars 76 act as short-circuited turns, inhibiting the passage of magnetic flux in a rotary direction between the axial flux conductors 76.

In the embodiment shown in Figs. 7 and 8, a plurality of pole pieces 27 and 27' are formed in the two legs 51 and 52, respectively, of a V-shaped member 53 which is journalled in a suitable bearing 54 mounted on the frame 55 of the machine, and in bearings 57 and 58 fitted in a ring 59. Suitable means such as a crank handle 56, for example, may be provided for rotating the member 53. Interposed between the rotor 26 and the legs 51 and 52 of the member 53 are a plurality of axially extending magnetic flux conductors 60 forming a substantially conical array about which the arms 51 and 52 can be freely rotated. As shown in Fig. 8, the depth of the flux conductors 60 is preferably a maximum directly below the zero skew position of the member 53 shown in Fig. 7, and is less for other angles of skew.

In operation, when the member 53 is in the Fig. 7 position, the rotor 26 remains at rest. However, as the member 53 is rotated to a position 90° away from the Fig. 7 position the rotor 26 begins to rotate, its speed depending on the angle of rotation of the member 53.

Figs. 9 and 10 illustrate another form of the invention employing a simple rotatable pole structure. In this embodiment, the pole pieces 27 and 27' are mounted in a row on an arm 61 having a pivot 62 journalled in a suitable support 63 and having a knob 64 by means of which the arm 61 may be rotated to different angular positions. Between the arm 61 and the rotor 26 are disposed a plurality of flux conductors 65 whose upper ends define a 90° sector of a circle (Fig. 9) and which converge downwardly towards the rotor 26 as shown in Fig. 10. With the arm 61 positioned as shown in Figs. 9 and 10, the rotor 26 rotates at maximum speed, the zero speed position of the arm 61 being parallel to the rotor axis. The manner of operation of this modification will be readily apparent.

From the foregoing, it will be understood that the invention provides novel and highly effective alternating current dynamoelectric machinery which is of exceptional utility as an adjustable speed alternating current motor. By employing axial magnetic flux conductors to provide an axial path for the flux concentration produced by the pole faces, as described, the desirable features of the apparatus disclosed in the above-mentioned copending application Serial No. 633,151 may be secured with a standard size rotor.

While specific forms of the invention disclosed herein by way of example provide for rotation in one direction only, it will be understood that reversal of the direction of rotation can be provided for if desired. This might be accomplished in the embodiment shown in Fig. 1, for example, by providing additional magnetic flux conductors 37 under the area swept out by the pole pieces 27 when the latter are skewed in the reverse direction by manipulation of the handle 35.

The several different embodiments disclosed herein are intended to be merely illustrative, and they are obviously susceptible of numerous modifications in form and detail within the spirit of the invention. For example, the pole piece rotating mechanism might be pivoted at an end instead of at the midpoint as shown in Fig. 1. Also, the pole pieces 27 and 27' may be adapted to be moved parallel to the rotor axis instead of around it. This might be accomplished by disposing the rotor conductors 28 and the flux conductors 66 at an angle to the rotor axis, and providing suitable means such as lead screws (not shown), for example, for moving the pole pieces 27 and 27' different distances parallel to the rotor axis, as indicated in Fig. 11. In this embodiment, the rotor is at rest when the row of pole pieces 27 and 27' is parallel to the conductors 28, as shown, and different speeds of rotation of the rotor 26 may be secured by moving the pole pieces 27 and 27' parallel to the axis to adjust the angle of skew between them and the rotor conductors 28. The specific embodiments described and illustrated herein, therefore, are not to be regarded as limiting in any way the scope of the following claims.

I claim:
1. In a polyphase alternating current dynamoelectric machine, the combination of a plurality of magnetic poles having their faces disposed in a row, windings for the several poles adapted to be connected to the respective phases of a polyphase alternating current source, armature means mounted adjacent the faces of said poles and spaced therefrom by an air gap, elongated conductor means carried by said armature means and extending in substantially the same direction as said row, said conductor means being of substantially lesser length than said row, means mounting said poles and armature means for relative movement of said conductor means substantially parallel to an initial position thereof in a direction at an angle to the length thereof, with the row of energized pole faces disposed at an angle to said conductor means and spaced therefrom, and high permeability magnetic flux conductor means interposed in said air gap between said row of poles and said armature means, said flux conductor means being adapted to provide a high permeability magnetic flux transmission path between said pole faces and said armature means for any flux component at an angle to said conductor means.

2. In a polyphase alternating current dynamoelectric machine, the combination of a plurality of magnetic poles having their faces disposed in a row, windings for the several poles adapted to be connected to the respective phases of a polyphase alternating current source, armature means mounted adjacent the faces of said poles and spaced therefrom by an air gap, elongated conductor means carried by said armature means and extending in substantially the same direction as said row, said conductor means being of substantially lesser length than said row, means mounting said poles and armature means for relative movement of said conductor means substantially parallel to an initial position thereof in a direction at an angle to the length thereof, with the row of energized pole faces disposed at an angle to said conductor means and spaced therefrom, and a plurality of substantially parallel high permeability magnetic flux conductors interposed between said row of poles and said armature means, each of said flux conductors having one dimension extending substantially parallel to said elongated conductor means and another dimension extending in a direction from said pole faces towards said elongated conductor means.

3. In a polyphase alternating current dynamoelectric machine, the combination of a plurality of magnetic poles having their faces disposed in a row, windings for the several poles adapted to be connected to the respective phases of a polyphase alternating current source, armature means mounted adjacent the faces of said poles and spaced therefrom by an air gap, elongated conductor means carried by said armature means and extending in substantially the same direction as said row, said conductor means being of substantially lesser length than said row, means mounting said poles and armature means for relative movement of said conductor means substantially parallel to an initial position thereof in a direction at an angle to the length thereof, with the row of energized pole faces disposed at an angle to said conductor means and spaced therefrom, means for adjusting the effective angle between said energized row of pole faces and said conductor means, and a plurality of substantially parallel high permeability magnetic flux conductors interposed between said row of poles and said armature means over an area corresponding approximately to the area swept out in adjusting the effective angle between said energized row of pole faces and said elongated conductor means, each of said flux conductors having one dimension extending substantially parallel to said elongated conductor means and another dimension extending at an angle to said elongated conductor means.

4. In a polyphase alternating current dynamoelectric machine, the combination of a plurality of magnetic poles having their faces disposed in a row, windings for the several poles adapted to be connected to the respective phases of a polyphase alternating current source, armature means mounted adjacent the faces of said poles and spaced therefrom by an air gap, elongated conductor means carried by said armature means and extending in substantially the same direction as said row, said conductor means being of substantially lesser length than said row, means mounting said poles and armature means for relative movement of said conductor means substantially parallel to an initial position thereof in a direction at an angle to the length thereof, with the row of energized pole faces disposed at an angle to said conductor means and spaced therefrom, means for adjusting the effective angle between said energized row of pole faces and said conductor means, and a plurality of substantially parallel magnetic flux conductors interposed between said row of poles and said armature means over an area corresponding approximately to the area swept out in adjusting the effective angle between said energized row of pole faces and said elongated conductor means, each of said flux conductors having one dimension extending substantially parallel to said elongated conductor means and another dimension extending at an angle to said elongated conductor means, and said flux conductors having different cross-sectional areas varying generally in accordance with the respective magnetomotive forces established by said poles for different adjustments of the effective angle between said energized row of pole faces and said elongated conductor means.

5. In a polyphase alternating current dynamoelectric machine, the combination of a plurality of magnetic poles having their faces disposed in a row, windings for the several poles adapted to be connected to the respective phases of a polyphase alternating current source, armature means mounted adjacent the faces of said poles and spaced therefrom by an air gap, elongated conductor means carried by said armature means and extending in substantially the same direction as said row, said conductor means being of substantially lesser length than said row, means mounting said poles and armature means for relative movement of said conductor means substantially parallel to an initial position thereof in a direction at an angle to the length thereof, with the row of energized pole faces disposed at an angle to said conductor means and spaced therefrom, means for adjusting the effective angle between said energized row of pole faces and said conductor means over a range of positive or negative values from a reference position, and a plurality of substantially parallel high permeability magnetic flux conductors interposed between said row of poles and said armature means over an area corresponding approximately to the area swept out in adjusting the effective angle between said energized row of pole faces and said elongated conductor means, each of said flux conductors having one dimension extending substantially parallel to said elongated conductor means and another dimension extending at an angle to said elongated conductor means, and said flux conductors having different cross-sectional areas varying generally in accordance with the respective magnetomotive forces established by said poles for different adjustments of the effective angle between said energized row of pole faces and said elongated conductor means.

6. In a polyphase alternating current dynamoelectric machine, the combination of a rotor carrying a plurality of axially extending electrical conductors, a stator, a plurality of coaxial pole carriages mounted on said stator for relative rotation about the axis of said rotor and each carrying a magnetic pole, said poles being disposed in an axial row, windings for the several poles adapted to be connected to the respective phases of a polyphase alternating current source, and means for simultaneously rotating said pole carriages relatively to each other to adjust the angle of skew of said row of poles with respect to said conductors.

7. In a polyphase alternating current dynamoelectric machine, the combination of a rotor carrying a plurality of axially extending electrical conductors, a stator, a plurality of coaxial pole carriages mounted on said stator for relative rotation about the axis of said rotor and each carrying a magnetic pole, said poles being disposed in an axial row, windings for the several poles adapted to be connected to the respective phases of a polyphase alternating current source, means for simultaneously rotating said pole carriages relatively to each other to adjust the angle of skew of said row of poles with respect to said conductors, and a plurality of substantially parallel high permeability magnetic flux conductors interposed between said stator and said rotor, each of said flux conductors providing a path from said poles to said rotor for any magnetic flux component from said poles at an angle to said conductors.

8. In a polyphase alternating current dynamoelectric machine, the combination of a stator, a plurality of coaxial pole carriages mounted on said stator for relative rotation about a common axis, and each carrying a magnetic pole, windings for said poles and adapted to be connected to the respective phases of a polyphase alternating current source, said poles forming an axial row, a rotor of substantially lesser length than said row of poles and carrying a plurality of axially extending conductors thereon, means for rotating pole carriages lying on opposite sides of a position intermediate the ends of said row of pole faces in opposite directions and by progressively greater amounts varying in accordance with the distance from said position to adjust the angle of skew between said row of pole faces and said conductor, and a plurality of substantially parallel high permeability magnetic flux conductors interposed between said stator and said rotor over an area corresponding approximately to the area swept out in adjusting the effective angle between said energized row of pole faces and said elongated conductor, each of said flux conductors having one dimension extending substantially parallel to said rotor conductors and another dimension extending from said poles to said rotor conductors.

9. In a polyphase alternating current dynamoelectric machine, the combination of a stator, a plurality of coaxial pole carriages mounted on said stator for relative rotation about a common axis, and each carrying a magnetic pole, windings for said poles and adapted to be connected to the respective phases of a polyphase alternating current source, said poles forming an axial row, a rotor of substantially lesser length than said row of poles and carrying a plurality of axially extending conductors thereon, means for rotating pole carriages lying on opposite sides of a position intermediate the ends of said row of pole faces in opposite directions and by progressively greater amounts varying in accordance with the distance from the opposite ends of said row of poles to adjust the angles of skew between the two rows of pole faces thus formed and said conductors, and a plurality of substantially parallel high permeability magnetic flux conductors interposed between said stator and said rotor over an area corresponding approximately to the area swept out in adjusting the effective angles between said energized rows of pole faces and said elongated conductor, each of said flux conductors having one dimension extending substantially parallel to said rotor conductors and another dimension extending from said poles to said rotor conductors.

10. In a polyphase alternating current dynamoelectric machine, the combination of a stator, a plurality of magnetic poles mounted on said stator for relative rotation about a common axis and forming an axial row, windings for said pole faces and adapted to be connected to the respective phases of a polyphase alternating current source, a rotor of substantially lesser length than said row of poles and carrying a plurality of axially extending electrical conductors, means for rotating said poles to adjust the angle of skew between said row of poles and said rotor conductors, and a plurality of substantially parallel high permeability magnetic flux conductors interposed between said stator and said rotor, said flux conductors providing a path from said poles to said rotor for any flux component from said poles at an angle to said rotor conductors, the cross-sectional area of said flux conductors being a maximum in the vicinity of the zero skew position of the poles and decreasing progressively to minima in the vicinity of the endmost poles in said row in the position of maximum skew.

11. In a polyphase alternating current dynamoelectric machine, the combination of a plurality of magnetic poles having their faces disposed in a row, windings for the several poles adapted to be connected to the respective phases of a polyphase alternating current source, armature means mounted adjacent the faces of said poles and spaced therefrom by an air gap, electrical conductor means carried by said armature means and extending in substantially the same direction as said row, said conductor means being of substantially lesser length than said row of pole faces, means mounting said poles and armature means for relative movement of said conductor means substantially parallel to an initial position thereof in a direction at an angle to the length thereof with the row of energized pole faces disposed at an angle to said conductor and spaced therefrom, means for rotating said row of pole faces to adjust the angle of skew between said conductor means and said row of pole faces, and a plurality of substantially parallel high permeability magnetic flux conductors interposed between said pole faces and said armature means, each of said flux conductors providing a path from said pole faces to said electrical conductor means for any flux component from said poles at an angle to said conductor means.

12. In a polyphase alternating current dynamoelectric machine, the combination of a rotor carrying a plurality of axially extending electrical conductors, a plurality of magnetic poles disposed about said rotor in a substantially circumferential row, windings for said poles and adapted to be connected to the respective phases of a polyphase alternating current source, and means for moving said poles axially of said rotor relatively to each other to adjust the effective angle of skew between said row of poles and said conductor.

13. In a polyphase alternating current dynamoelectric machine, the combination of a rotor carrying a plurality of axially extending electrical conductors, a plurality of magnetic poles disposed about said rotor in a substantially circumferential row, windings for said poles and adapted to be connected to the respective phases of a polyphase alternating current source, means for moving said poles axially of said rotor relatively to each other to adjust the effective angle of skew between said row of poles and said conductor, and a plurality of substantially parallel high permeability magnetic flux conductors interposed between said poles and said rotor conductors over an area corresponding approximately to the area swept out in adjusting the angle of skew between said row of poles and said electrical conductors, each of said flux conductors having one dimension extending substantially parallel to said electrical conductors and another dimension extending from said poles towards said electrical conductors.

14. In a polyphase alternating current dynamoelectric machine, the combination of a plurality of magnetic poles disposed longitudinally in a row, windings for said poles adapted to be connected to the respective phases of a polyphase alternating current source so as to cause a magnetic flux wave to travel along said row, means for adjusting the lateral distances between each of said poles to adjust the direction of travel of said wave, armature means carrying elongated conductor means movably mounted so as to be influenced by said traveling wave, and high permeability magnetic flux conductor means interposed between said row of poles and said armature means.

15. In a polyphase alternating current dynamoelectric machine, the combination of movable armature means having elongated conductor means thereon, a plurality of magnetic poles mounted with their faces facing said armature means, windings for the several poles adapted to be connected to the respecetive phases of a polyphase alternating current source of electrical energy, means mounting said poles and armature means for relative movement of said conductor means substantially parallel to an initial position thereof in a direction at an angle to its length, with the row of energized pole faces disposed at an angle to said conductor means and spaced therefrom, magnetic flux conductor means interposed between said row of poles and said armature means and providing a magnetic flux transmission path between said pole faces and said armature means, and electrical conductor means interposed between said flux conductor means and insulated therefrom.

16. In a polyphase dyamoelectric machine, the combination of movable armature means having elongated conductor means thereon, a plurality of magnetic poles mounted with their pole faces facing said armature means and spaced apart from one another in the direction of said conductor means, windings for the several poles adapted to be connected to the respective phases of a polyphase alternating current source, means facilitating adjustment of the pole pitch between said poles laterally of said conductor means, and high permeability magnetic flux conductor means interposed between said poles and said armature means and providing high permeability magnetic flux transmission paths therebetween.

CHARLES E. ELLIS.

REFERENCES CITED

The following references are of record in the file of this patent:

UNITED STATES PATENTS

| Number | Name | Date |
| --- | --- | --- |
| 1,086,096 | Starker | Feb. 3, 1914 |
| 1,227,185 | Neuland | May 22, 1917 |
| 1,514,474 | Steward | Nov. 4, 1924 |
| 1,559,920 | Steward | Nov. 3, 1925 |
| 1,776,518 | McShane | July 7, 1928 |
| 2,006,172 | Klappauf | June 25, 1935 |
| 2,470,767 | Ellis | May 24, 1949 |